(12) United States Patent
Moon et al.

(10) Patent No.: US 10,249,217 B2
(45) Date of Patent: Apr. 2, 2019

(54) REFRESHABLE TACTILE DISPLAY

(71) Applicant: Tactile Engineering, LLC, Lafayette, IN (US)

(72) Inventors: Alexander Moon, West Lafayette, IN (US); Thomas Baker, West Lafayette, IN (US); David A. Schleppenbach, Lafayette, IN (US)

(73) Assignee: Tactile Engineering, LLC, Lafayette, IN (US)

( * ) Notice: Subject to any disclaimer, the term of this patent is extended or adjusted under 35 U.S.C. 154(b) by 0 days.

(21) Appl. No.: 16/048,516

(22) Filed: Jul. 30, 2018

(65) Prior Publication Data

US 2018/0336801 A1 Nov. 22, 2018

Related U.S. Application Data

(60) Division of application No. 15/341,713, filed on Nov. 2, 2016, now Pat. No. 10,127,832, which is a continuation of application No. PCT/US2015/027750, filed on Apr. 27, 2015.

(60) Provisional application No. 61/994,576, filed on May 16, 2014.

(51) Int. Cl.
    *G09B 21/00* (2006.01)
(52) U.S. Cl.
    CPC .................. *G09B 21/004* (2013.01)
(58) Field of Classification Search
    CPC ........................................... G09B 21/04
    See application file for complete search history.

(56) References Cited

U.S. PATENT DOCUMENTS

| | | | | |
|---|---|---|---|---|
| 4,871,992 A | * | 10/1989 | Petersen | G09B 21/003 340/407.1 |
| 5,086,287 A | | 2/1992 | Nutzel | |
| 5,466,154 A | | 11/1995 | Thompson | |
| 6,109,922 A | | 8/2000 | Litschel et al. | |
| 6,459,364 B2 | | 10/2002 | Gupta | |
| 6,705,868 B1 | * | 3/2004 | Schleppenbach | G09B 21/004 434/112 |
| 2008/0227060 A1 | * | 9/2008 | Esashi | G09B 21/004 434/113 |
| 2009/0023116 A1 | | 1/2009 | Shaw | |
| 2014/0038139 A1 | * | 2/2014 | AlDossary | G09B 21/001 434/114 |
| 2016/0224116 A1 | * | 8/2016 | Hagedorn | G09B 21/003 |
| 2018/0003319 A1 | * | 1/2018 | Besse | F16K 99/0038 |
| 2018/0033336 A1 | * | 2/2018 | Shah | H01L 29/435 |

FOREIGN PATENT DOCUMENTS

| | | |
|---|---|---|
| CN | 102176293 A | 4/2005 |
| KR | 10-2005-0034911 A | 4/2005 |

OTHER PUBLICATIONS

Written Opinion and Search Report from PCT application No. PCT/US2015/027750 dated Jul. 23, 2015.

* cited by examiner

*Primary Examiner* — Corbett B Coburn

(74) *Attorney, Agent, or Firm* — Woodard, Emhardt, Henry, Reeves & Wagner, LLP; John McNett; William McKenna

(57) ABSTRACT

A system for providing a tactile display is disclosed. The system utilizes magnetic forces and actuators in order to move a series of tactile elements. The system can be arranged such that the display may include an entire array of thousands of elements.

5 Claims, 7 Drawing Sheets

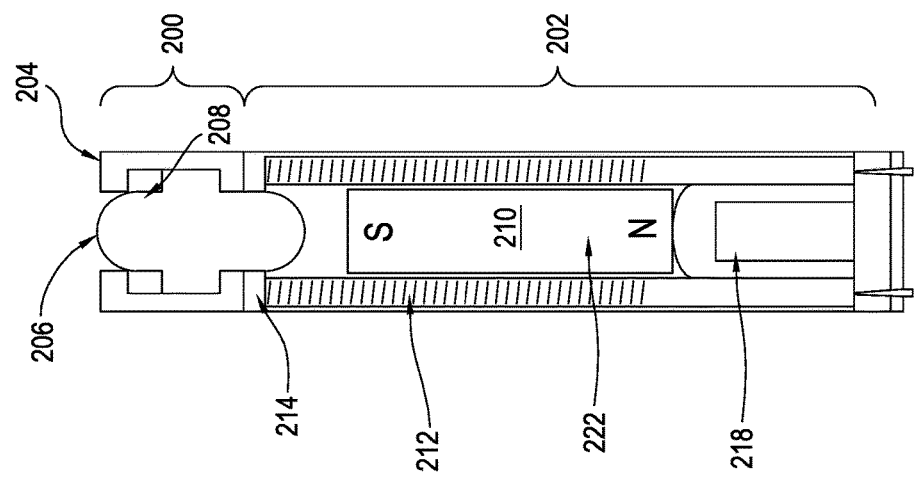
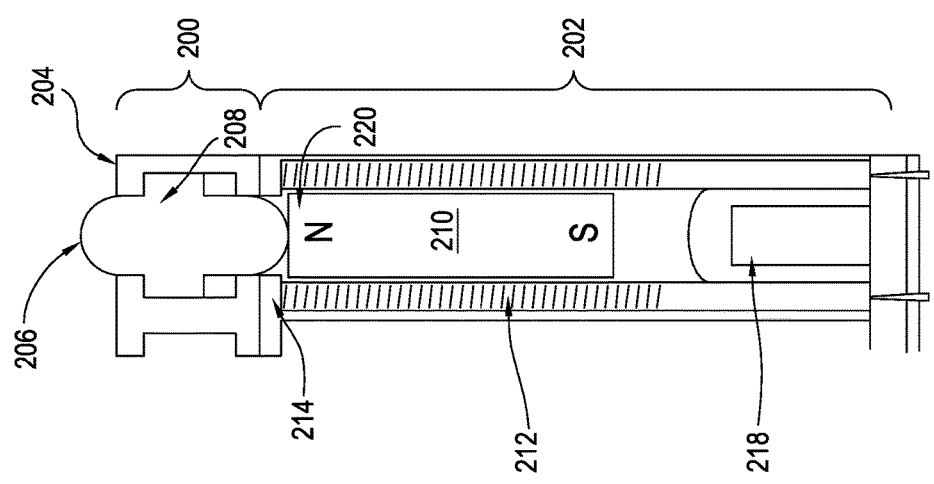

REFRESHABLE TACTILE DISPLAY

CROSS REFERENCE TO RELATED APPLICATIONS

This application is a divisional of U.S. patent Ser. No. 15/341,713, filed Nov. 2, 2016 which is a continuation of International Patent Application No. PCT/US2015/027750, filed Apr. 27, 2015 which claims the benefit of U.S. Provisional Application No. 61/994,576 filed May 16, 2014, all of which are incorporated herein by reference.

BACKGROUND

The present disclosure pertains generally to tactile and braille displays. Several variations of these displays have been developed, but all have significant shortcomings. The most prevalent of these devices use piezo electric actuators to move the tactile elements. These piezo actuators are relatively expensive, fragile, slow to change states, require unsafe voltages to actuate, and are relatively large. These shortcoming severely limit the number of moveable tactile elements that can be displayed on a device using the piezo technology. Additionally, current displays require maintenance in the form of annual cleaning of the display elements to maintain the functionality of the units. This cleaning is performed by technicians and is therefore time consuming and expensive. Thus, there is a need for improvement in this field.

SUMMARY

Although several different technologies have been explored for the creation of tactile displays, none have been suitable for the production of a full page tactile display. Such a display requires high density and power efficient actuation devices. To be commercially successful, the mechanism must additionally be relatively inexpensive. The present disclosure provides for a unique mechanism meeting these criteria and discloses additional benefits that can be obtained by using the unique mechanism.

The unique actuation mechanism presently disclosed can include a permanent magnet for latching. The mechanism can also include a coil adjacent to the permanent magnet. When the current flows through the coil, the position of the permanent magnet can be altered between two positions. In this way, the permanent magnet can be associated with a tactile element or a braille dot whose position can be altered depending on the position of the permanent magnet. When the permanent magnet is stationary in either of the two positions, no current need be applied to the coil to maintain the position of the magnet, substantially eliminating idle power draw. Utilizing this unique actuation mechanism, a high density tactile display can be made inexpensively of virtually unlimited size, with minimal power use.

Correspondingly, a unique feature using the unique actuation mechanism is presently disclosed in that the tactical display can be manufactured with two enclosures that can be removeably joined together to from the tactical display. One of these enclosures can house the tactile elements while the second enclosure can house the unique actuation mechanism. The first enclosure can be made suitable to be cleaned by the user when removed from the second enclosure and rejoined to the second enclosure when the cleaning is complete.

Another unique feature presently disclosed pertains to the electrical circuitry required to actuate the tactile display using the unique actuation mechanism. The circuitry required for the operation of the mechanism ideally can support a high density array of the unique actuating devices. As will become apparent from the present disclosure, the circuitry can be made to minimize the number of signals required to actuate the array, to minimize the leakage current of the circuitry components, and to minimize the thermal output of the circuitry components. Additionally, the circuitry can be made physically compact to support the high density array and can be made relatively inexpensively.

To better summarize, reference will be made to various "aspects", each of which can be considered independently of the other aspects:

"Aspect 1" concerns an array of displayed dots suitable for use as a braille character, wherein each dot is suitable for being in a first raised position to become part of the braille character and a second position that does not serve as a part of a braille character, wherein each dot has an associated mechanism magnetically latched, without the need for retaining current, corresponding to each of the two positions using permanent magnetism, wherein the array includes a permanent magnet for each dot, together with an electric coil for each permanent magnet positioned to change the position of said permanent magnet in response to current through said coil and said electric coils each encircle a corresponding permanent magnet, and wherein each of said permanent magnets and each of said dots are individually and separately moveable.

"Aspect 2" concerns an array of displayed dots suitable for use as a braille character, wherein each dot is suitable for being in a first raised position to become part of the braille character and a second position that does not serve as a part of a braille character, wherein each dot has an associated mechanism magnetically latched, without the need for an electric retaining current, corresponding to each of the two positions using permanent magnetism, wherein the array includes a permanent magnet for each dot, together with an electric coil for each permanent magnet positioned to change the position of said permanent magnet in response to current through said coil and said electric coils each encircle a corresponding permanent magnet, and wherein the average current through said coil is substantially greater during the first half of the travel of said permanent magnet than during the second half of the travel toward a latched position, and moves said permanent magnet partially between said two positions taking advantage of the momentum acquired by the motion of the permanent magnet during the first half of travel to allow a reduction in current during the second half of travel.

"Aspect 3" concerns the array of any previous aspect in which there is no current externally applied through said coil during the last 10% of the travel of said permanent magnet toward a latched position.

"Aspect 4" concerns the array of aspect 2 additionally comprising dynamic braking of said permanent magnet during a portion of the second half of the travel toward a latched position.

"Aspect 5" concerns the array of any previous aspect additionally comprising regenerative braking of said permanent magnet during a portion of the second half of the travel toward a latched position.

"Aspect 6" concerns the array of any previous aspect wherein a magnetically reactive material is encircled by said electric coil and is utilized for said magnetic latching in the first or second position.

"Aspect 7" concerns the array of any previous aspect wherein magnetic shielding is utilized between said electric coils of adjacent dots to reduce the magnetic field strength induced by said electric coil to the location of adjacent permanent magnets to a value less than 100 Gauss.

"Aspect 8" concerns the array of any previous aspect wherein the permanent magnet is a rare earth magnet.

"Aspect 9" concerns a larger array using several arrays of any previous aspect to display a plurality of rows of braille characters, each row capable of displaying a plurality of braille characters.

"Aspect 10" concerns the larger array of any previous aspect in which there are at least three rows of braille characters with at least 8 braille characters in each row.

"Aspect 11" concerns the array of any previous aspect wherein the distance center to center between two adjacent dots in a braille character is less than one fourth inches.

"Aspect 12" concerns the array of any previous aspect wherein the distance center to center between two adjacent dots in a braille character is less than one eighth inches.

"Aspect 13" concerns the array of any previous aspect wherein the distance center to center between two adjacent magnets is less than one fourth inches.

"Aspect 14" concerns the array of any previous aspect wherein the distance center to center between two adjacent magnets is less than one eighth inches.

"Aspect 15" concerns the array of any previous aspect wherein each permanent magnet is arranged such that its magnetic polarity is opposite to an adjacent permanent magnet.

"Aspect 16" concerns the array of any previous aspect wherein the array is configured such that the magnetic force provided by the magnetic latch for each dot in the raised dot configuration remains stable to a force applied to the dot of 20 gram-force units.

"Aspect 17" concerns the array of any previous aspect in which the magnetic force provided by the magnetic latch for each dot in the raised dot configuration will non-destructively release if a force is applied to the dot of 50 gram-force units.

"Aspect 18" concerns the array of any previous aspect wherein the magnetic latch will non-destructively release if sufficient force is applied to its corresponding dot in its raised configuration.

"Aspect 19" concerns the array of any previous aspect wherein the magnetic latch will not release its holding of raised dots upon normal use in reading the braille character.

"Aspect 20" concerns the array of any previous aspect wherein the average current moving said dot to said second position is greater than the average current moving said dot to the first raised position.

"Aspect 21" concerns the array of any previous aspect wherein the magnetic force makes the dots resilient so they return to the first position if manually depressed.

"Aspect 22" concerns the array of any previous aspect wherein the array includes a first housing retaining the dots and wherein the first housing is configured to prevent the dots from being depressed beyond a position where they can resiliently return to the first position.

"Aspect 23" concerns the array of any previous aspect in which current through said coil causes linear movement of said permanent magnet.

"Aspect 24" concerns the array of any previous aspect placed in a portable, battery-operated device.

"Aspect 25" concerns the array of any previous aspect additionally including an interface with a computer.

"Aspect 26" concerns the array of any previous aspect in which the interface uses a wireless interface.

"Aspect 27" concerns the array of any previous aspect in which said wireless interface is Bluetooth® compatible.

"Aspect 28" concerns the array of any previous aspect wherein the array comprises at least 1,200 elements and can be cycled in less than 2 seconds.

"Aspect 29" concerns the array of any previous aspect wherein the array can be cycled in less than 1 second.

"Aspect 30" concerns the array of any previous aspect wherein the entire array can be cycled in less than 0.2 seconds.

"Aspect 31" concerns the array of any previous aspect wherein said permanent magnet is prevented from making physical contact with magnetically reactive material by a non-magnetically reactive material.

"Aspect 32" concerns the array of any previous aspect wherein the non-magnetically reactive material comprises a part of the unitary dot element.

"Aspect 33" concerns an array of displayed dots suitable for use as a braille character, wherein each dot is suitable for being in a first raised position to become part of the braille character and a second position that does not serve as a part of a braille character, wherein each dot has at least one uniquely associated permanent magnet and an associated dual state latch in which each of the dual states is maintained using said uniquely associated permanent magnet, wherein each of said at least one uniquely associated permanent magnets are adapted to latch successively at each of the two positions, with movement induced by current flowing in an adjacent coil, and wherein each of said permanent magnets and each of said dots are individually and separately moveable.

"Aspect 34" concerns an array of displayed dots suitable for use as a braille character, wherein each dot is suitable for being in a first raised position to become part of the braille character and a second position that does not serve as a part of a braille character, wherein each dot has at least one uniquely associated permanent magnet and an associated dual state latch in which each of the dual states is maintained using said uniquely associated permanent magnet, wherein each of said at least one uniquely associated permanent magnets are adapted to latch successively at each of the two positions, with movement induced by current flowing in an adjacent coil, and wherein the average current through said coil is substantially greater during the first half of the travel of said permanent magnet than during the second half of the travel toward a latched position, and moves said permanent magnet partially between said two positions taking advantage of the momentum acquired by the motion of the permanent magnet during the first half of travel to allow a reduction in current during the second half of travel.

"Aspect 35" concerns an array of moveable elements suitable for use as a raised tactile display, wherein each element is suitable for being in a first raised position to be tactilely sensed by a user and a second position that does not provide the same sensation as the first position, wherein each element has an associated mechanism magnetically latched and corresponding to each of the two positions using permanent magnetism, wherein the latching is free from substantial power consumption except during changes of state, and wherein the array comprises at least 64 elements whose raised positions can be simultaneously touched by a user.

"Aspect 36" concerns the array of any previous aspect wherein the array comprises at least 1,200 elements.

"Aspect 37" concerns the array of any previous aspect wherein the array comprises at least 6,000 elements.

"Aspect 38" concerns the array of any previous aspect wherein the array comprises at least 9,600 elements.

"Aspect 39" concerns the array of any previous aspect wherein the form of the array is a matrix with at least 15 vertical elements and at least 40 horizontal elements.

"Aspect 40" concerns the array of any previous aspect, wherein each element is configured to be moved by a permanent magnet utilized for latching, and wherein the center of each permanent magnet is less than one quarter inch from the center of an adjacent permanent magnet.

"Aspect 41" concerns the array of any previous aspect wherein the center of each permanent magnet is less than one eighth inch from the center of an adjacent permanent magnet.

"Aspect 42" concerns the array of any previous aspect, wherein each element is configured to be moved by a permanent magnet utilized for latching, and wherein each permanent magnet is less than one eighth of an inch from an adjacent permanent magnet.

"Aspect 43" concerns the array of any previous aspect in which the spacing between all adjacent permanent magnets is uniform.

"Aspect 44" concerns the array of any previous aspect in which the array has hexagonal, rectangular or square relationships between adjacent elements.

"Aspect 45" concerns the array of any previous aspect in which the array has square relationships between adjacent elements.

"Aspect 46" concerns the array of any previous aspect wherein the array includes a permanent magnet for each element, together with an electric coil for each permanent magnet positioned to allow current through said coil to change the position of said permanent magnet.

"Aspect 47" concerns the array of any previous aspect in which said electric coils each encircle a corresponding permanent magnet.

"Aspect 48" concerns the array of any previous aspect in which current through said coil causes linear movement of said permanent magnet.

"Aspect 49" concerns the array of any previous aspect placed in a portable, battery-operated device.

"Aspect 50" concerns the array of aspect 35, 36, 37, 38, 39, 46, 47 or 48 additionally including an interface with a computer.

"Aspect 51" concerns the array of any previous aspect in which the interface uses a wireless interface.

"Aspect 52" concerns the array of any previous aspect in which said wireless interface is Bluetooth® compatible.

"Aspect 53" concerns the array of any previous aspect wherein the array comprises at least 1,200 elements that can be cycled in less than 2 seconds.

"Aspect 54" concerns the array of any previous aspect wherein said at least 1200 elements can be cycled in less than 1 second.

"Aspect 55" concerns the array of any previous aspect wherein the entire array can be cycled in less than 0.2 seconds.

"Aspect 56" concerns a raised tactile display having a readily cleanable component comprising, a plurality of moveable elements, a first housing containing said elements, said first housing and elements made of material suitable for cleaning with a liquid, and a second housing adapted to removeably join with said first housing, said second housing containing mechanisms for moving said elements when joined with said first housing, wherein each element, when said first housing is joined to said second housing, is suitable for being in a first raised position to be tactilely registered by a user and a second position that does not provide the same sensation as the first position; and wherein removing said first housing allows said first housing and elements contained by said first housing to be cleaned when unmounted without said second housing being exposed to liquid used in cleaning said first housing and wherein said first housing can be rejoined to said second housing after cleaning.

"Aspect 57" concerns the display of any previous aspect in which said first housing contains at least 64 moveable elements.

"Aspect 58" concerns the display of any previous aspect in which said first housing contains at least 1200 moveable elements.

"Aspect 59" concerns the display of any previous aspect in which said first housing contains at least 6,000 moveable elements.

"Aspect 60" concerns the display of any previous aspect in which said first housing contains at least 9600 moveable elements.

"Aspect 61" concerns the display of any previous aspect wherein said first housing and said elements are made of a material that is not damaged by a temperature of 120 degrees Celsius.

"Aspect 62" concerns the display of any previous aspect wherein the display includes a mechanism for guiding said first housing into a correct position for mounting said first housing to said second housing.

"Aspect 63" concerns the display of any previous aspect wherein the first housing and said second housing each have tactile indicia to aid in alignment when joining them to each other.

"Aspect 64" concerns a circuit for controlling a refreshable variable surface comprising a plurality of bidirectional devices addressed through a matrix that includes first addressable axes and second addressable axes, a tactile display element associated with each of said bidirectional devices, a first plurality of switches, each of said first plurality of switches configured to address one of said first addressable axes, a second plurality of switches, each of said second plurality of switches configured to address one of said second addressable axes, a third plurality of semiconductor components, and wherein each of said third plurality of components is electrically in series between one of said first plurality of switches and one of said second plurality of switches, and wherein one of said bidirectional devices can be actuated in either direction using the matrix.

"Aspect 65" concerns the circuit of any previous aspect wherein said third plurality of semiconductor components includes transistors.

"Aspect 66" concerns the circuit of any previous aspect wherein said third plurality of transistors are configured to be addressed by said first addressable axis or said second addressable axis.

"Aspect 67" concerns the circuit of any previous aspect wherein the circuit includes a mechanism for automatically activating at least one of said third plurality of transistors when one of said first or second plurality of switches is activated.

"Aspect 68" concerns the circuit of any previous aspect wherein the number of said third plurality of components is at least as many as the number of said bidirectional devices.

"Aspect 69" concerns the circuit of any previous aspect wherein said third plurality of components are diodes.

"Aspect 70" concerns the circuit of any previous aspect wherein the number of said third plurality of diodes is equal to at least two times the number of said bidirectional devices.

"Aspect 71" concerns the circuit of any previous aspect additionally providing for simultaneously addressing more than one of said first addressable axes when one of said second addressable axes is addressed, whereby a simultaneous change of state of more than one of said tactile display elements can be achieved.

"Aspect 72" concerns the circuit of any previous aspect in which one of said addressable axes does not carry an activation signal between the times that changes of state are being made.

"Aspect 73" concerns the circuit of any previous aspect in which said bidirectional devices only have substantial signals to them when they are changing state.

"Aspect 74" concerns the circuit of any previous aspect in which said bidirectional devices include permanent magnets positioned inside of corresponding coils of wire.

Further forms, objects, features, aspects, benefits, advantages, and embodiments of the present invention will become apparent from a detailed description and drawings provided herewith.

BRIEF DESCRIPTION OF THE DRAWINGS

FIG. 2A shows a side section view of an example of one display element in its first position and shows its associated actuation and latching mechanisms suitable for use with the arrays of FIGS. 1A-C.

FIG. 2B shows the device of FIG. 2a except with the display element and associated latching mechanism in its second position.

DESCRIPTION OF THE SELECTED EMBODIMENTS

Figure 1A:
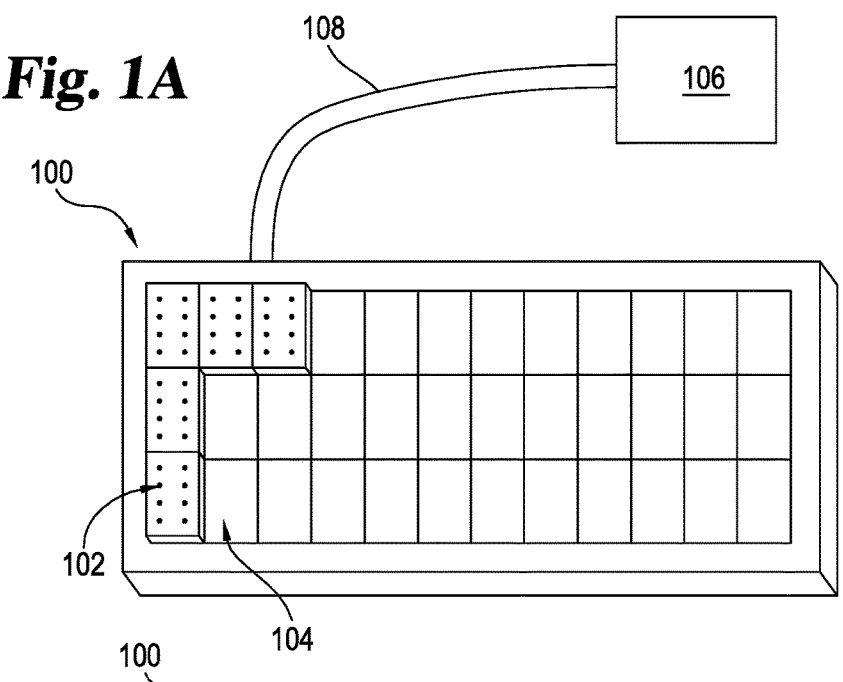
FIG. 1A shows an isometric view of an example of the device using the tactile array arranged for braille reading.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1B:
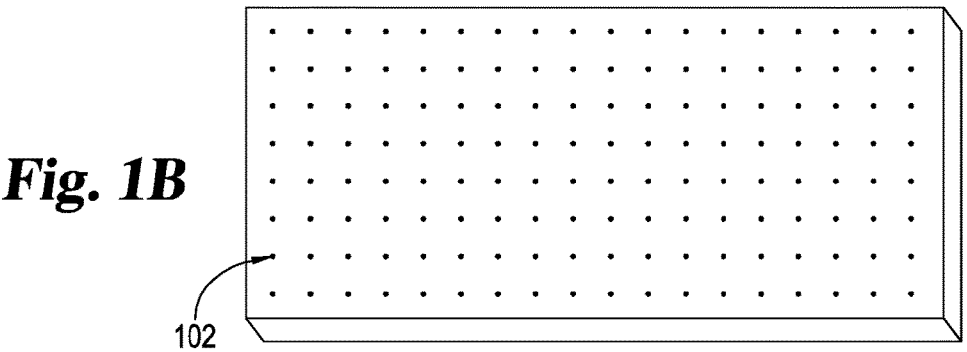
FIG. 1B shows an isometric view of an example of the device using the tactile array arranged uniformly.
Figure 1C:
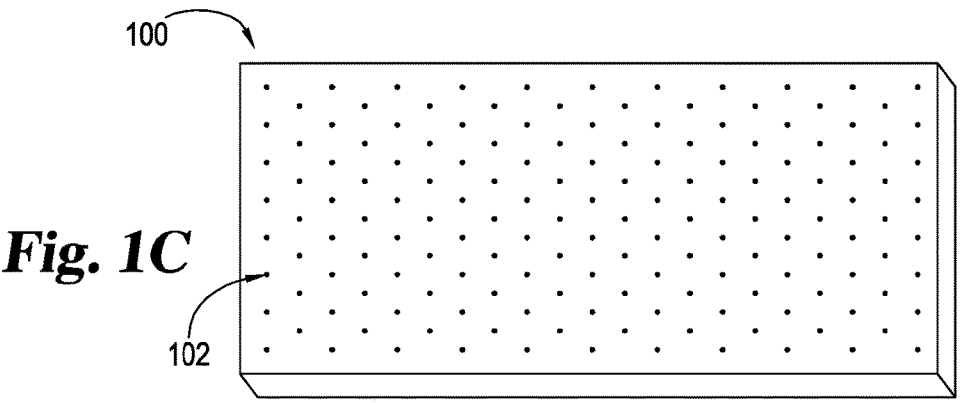
FIG. 1C shows an isometric view of an example of the device using the tactile array arranged in a hexagonal relationship.

FIG. 1A illustrates an isometric view of an example of a device 100 configured to be used as a braille input and/or output device. The device can include multiple braille cells 104 each containing six or eight braille dots 102. Additionally, the device can be configured to function as a braille cell for use with preexisting braille devices. The illustrated device includes a notional connection 108 to an external device 106 which can be a computer or other device. As will be apparent from the present disclosure the device 100 can be battery-powered or powered via an external interface. Additionally, the device can send and receive data via a wireless (such as Bluetooth®) or a wired interface. FIG. 1B illustrates an isometric view of a different example of a device 100 configured to be used as a tactile display. The device can include multiple tactile elements 102. Illustrated in this example is a uniform arrangement of the tactile elements 102. FIG. 1C illustrates an isometric view of yet another example of the device 100 configured to be used as a tactile display wherein the tactile elements 102 are arranged in a hexagonal configuration. As will be apparent to the present disclosure the device 100 can contain several configurations of tactile elements that can be arranged in rectangular, square, hexagonal, or uniform arrangements in multiple combinations. These combinations may or may not include tactile elements suitable for use as a braille character.

FIGS. 2A and 2B illustrate side sectional views of the device having a top portion 200 and a bottom portion 202. In this example the top portion 200 includes housing material 204 enclosing a movable tactile element 208. The tactile elements 208 can form a variety of shapes. In this example, the tactile element 208 is configured to form a braille dot 206 to be tactilely sensed by a user when in a first position and provides a different tactile sensation when a second position that is not suitable for being part of a braille character.

In these examples, a permanent magnet 210 is configured to facilitate the movement of the tactile element 208 between the first and second positions. The tactical element 208 can be joined to the permanent magnet 210 or it can be separately moveable, as illustrated. The permanent magnet 210 can be encircled by a metal coil 212. When electrical current flows through the coil 212 a resulting magnetic force can act upon the permanent magnet 210. In this manner, the direction of the flow of the current can be utilized to change the position of the permanent magnet 210 and therefore the position of the tactile element 208. As illustrated, when current flows through the coil 212, the permanent magnet 210 linearly moves between two positions. When current is not flowing through the coil 212, the permanent magnet 210 can be magnetically latched at one or the other of the two positions. Magnetically reactive material can be strategically positioned to facilitate this magnetic latching.

As illustrated in FIG. 2A, when the permanent magnet 210 is in the first position 220, the magnetic force between the permanent magnet 210 and the first magnetically reactive material 214 latches the permanent magnet 210 in the first position 210. As illustrated in FIG. 2B, when the permanent magnet 210 is in the second position 222, the magnetic force between the permanent magnet 210 and the second magnetically reactive material 218 latches the permanent magnet 210 in the second position 222. In this configuration, the magnetic latching in the first position will non-destructively release if sufficient force is applied to the corresponding tactile element 208 in the raised position. The device can also be configured such that when the tactile element 208 is depressed slightly, the permanent magnet 210 is still magnetically attracted to the first magnetically reactive material 214 and not the second magnetically reactive material 218 and therefore automatically returns to the first position after being depressed. The device can be further configured (as illustrated) such that the housing material 204 prevents the tactile element 208 from being depressed beyond a point where the permanent magnet 210 will return to the first position. The device can be configured such that the magnetic latching force of the permanent magnet 210 in the first position will non-destructively release if 50 gram-force units are applied to the corresponding tactile element 208. The device can also be configured such that the magnetic latching force of the permanent magnet 210 in the first position will not release if 20 gram-force units are applied to the corresponding tactile element 208. The permanent magnet 210 can be a rare earth magnet to increase the latching forces.

Figure 3:
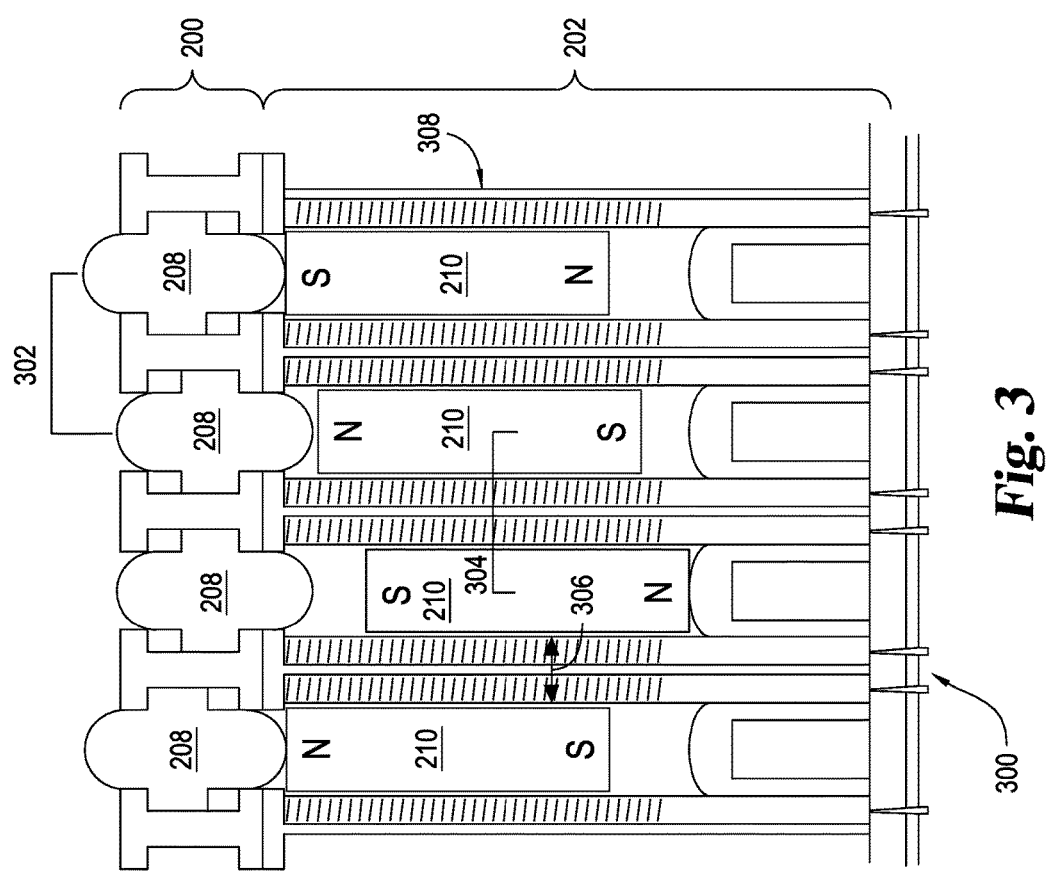
FIG. 3 shows a side view of an array of the devices of FIGS. 2a and 2b arranged in a larger array.

FIG. 3 illustrates a side view of an example device 300 using a larger array of the example devices of FIG. 2. As illustrated in this example, the top portion 200 houses multiple tactile elements 208. Correspondingly the bottom portion 202 encloses multiple permanent magnets 210. The distance center to center between tactile elements 208 can be selected such that the tactile elements 208 have a density suitable to be used as part of a braille character or other tactile displays examples of which are illustrated in FIGS. 1A, 1B, and 1C. The distance center to center between tactile elements 208 can preferably be less than one fourth inches or more preferably less than one eighth of an inch. Additionally, the distance center to center between permanent magnets 304 and/or the distance 306 between permanent magnets 304 can similarly be selected. The distance center to center between permanent magnets 304 can be preferably less than one fourth of an inch or more preferably less than one eighth of an inch. As will be apparent from the present disclosure, the device 300 can be made to house a large array of tactile elements 208. Examples sizes of these arrays are 64, 1,200, 6,000, or 9,600 tactile elements 208 or can be arranged in an array with at least 15 vertical tactile elements 208 and at least 40 horizontal tactile elements 208. It should be evident that an array of any size can be created utilizing the actuation mechanism disclosed herein.

The bottom portion 202 can also contains material 308 suitable for magnetically shielding the independent actuation devices. This material can aid in preventing inadvertent actuation of adjacent permanent magnets 210. The permanent magnets 210 can be arranged such that adjacent permanent magnets can have opposite polarities. These opposite polarities aid in minimizing the net magnetic field generated by the device 300.

Figure 4:
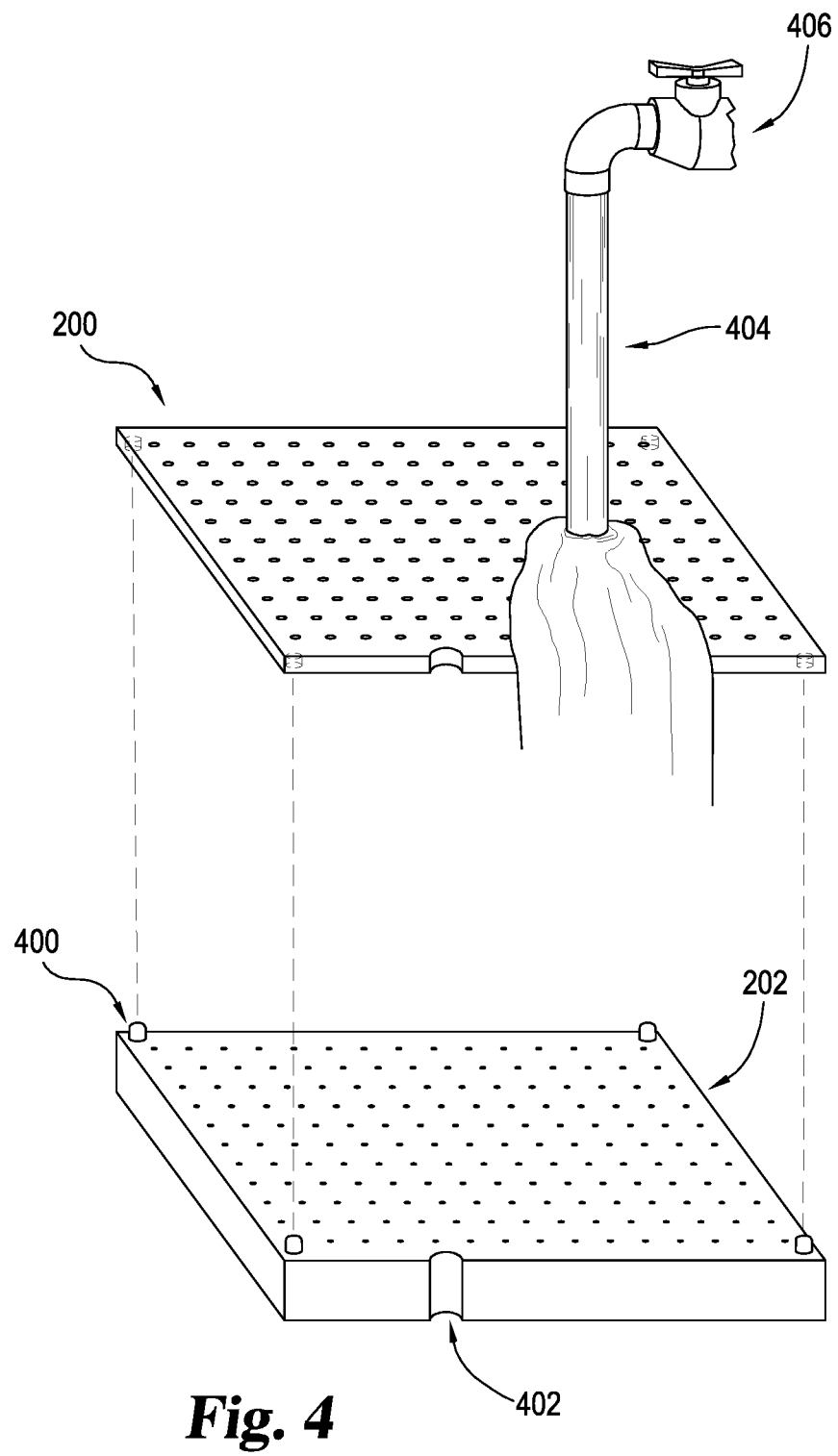
FIG. 4 shows an isometric view of an example of the device of FIG. 3 with a removable top section, shown as removed with cleaning water running on it.

FIG. 4 illustrates an example device feature that can be enabled through the present disclosure. In FIG. 4, the top portion 200 is removably joined to the bottom portion 202. The top portion 200 is shown to be removed in FIG. 4 to enable cleaning of the top portion. Protrusions 400 are included on the bottom portion 202 to aid in guiding the top portion 200 (not shown) to the bottom portion 202. The protrusions 400 can have corresponding indentations on the top plate 200 to aid in guiding or can serve as tactile indicators. Another example of a tactile indicator is an indented area shown as element 402.

Figure 5:
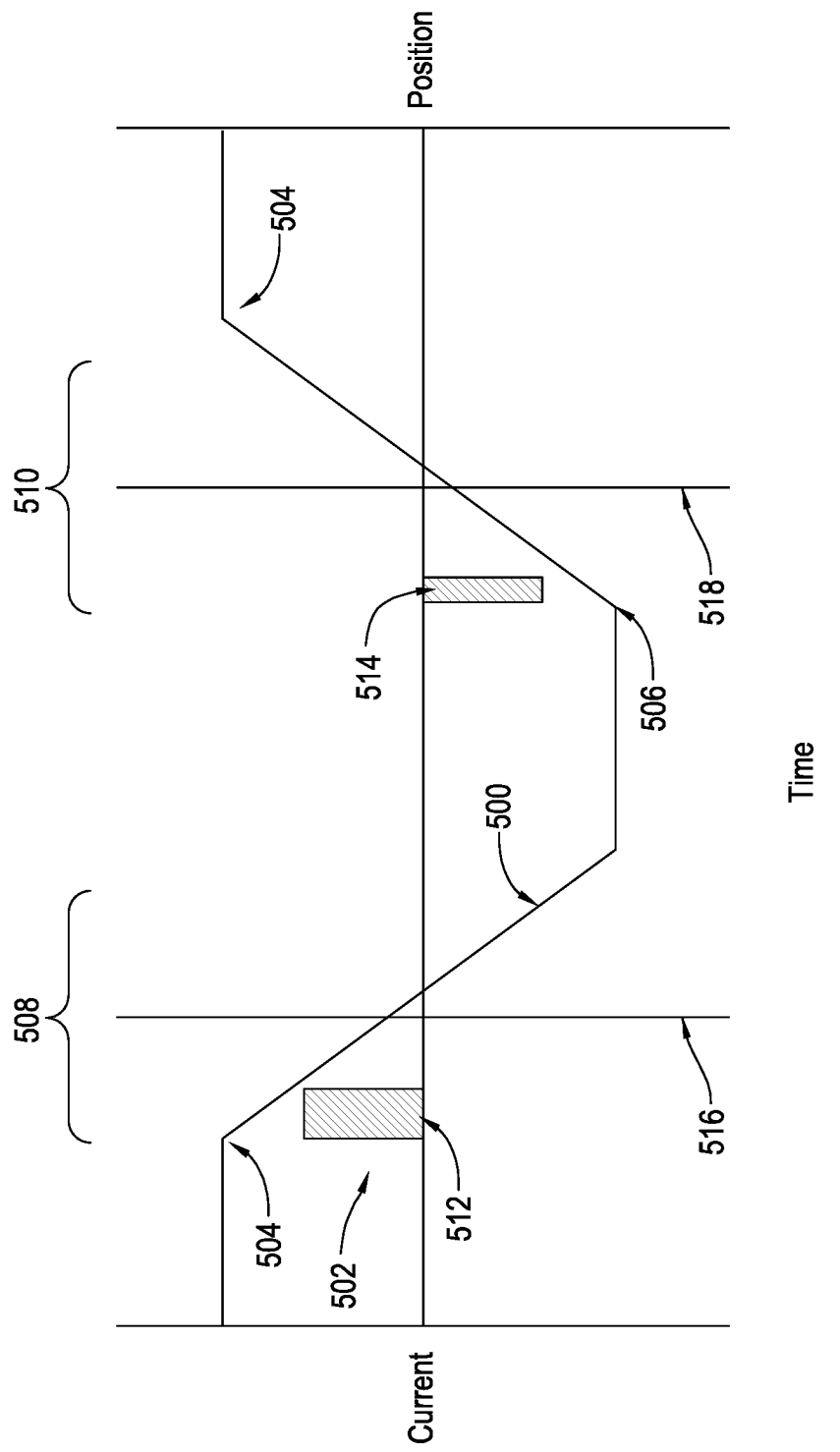
FIG. 5 shows an example current and position vs time chart for an example of the device of FIGS. 2a and 2b.

FIG. 5 illustrates a current and position versus time graph using the actuating mechanism disclosed herein. The position line 500 shows the transitions of the permanent magnets between the first position and second position. The first position is illustrated as 504 while the second position is illustrated as 506. Therefore, the line 500 illustrates a transition 508 between the first position 504 to the second position 506 and another transition 510 between the second position 506 and the first position 504. The line 502 illustrates the current flow through the coil to actuate the mechanism. During the first transition 508 the current flow is an opposite direction of the second transition 510. The midpoint of transition 508 is illustrated as element 516. The midpoint of transition 510 is illustrated as element 518. These midpoints aid in the illustration of an example coil excitation schema. In order to minimize the power drawn by the mechanism, the coils do not have to be energized for the entire transition between two positions of the permanent magnet and especially not during the last 10% of their travel. Therefore, the average current draw for the first half of the transition can be more than the average current draw during the second half of the transition. Element 512 illustrates an example current pulse to induce transition 508. Element 514 illustrates an example current pulse to induce transition 510. It can be advantageous for the holding force of the tactile element in the first position to be greater than the holding force of the tactile element in the second position. Therefore, current pulse 512 can be of longer duration and/or amplitude than pulse 514.

Figure 6A:
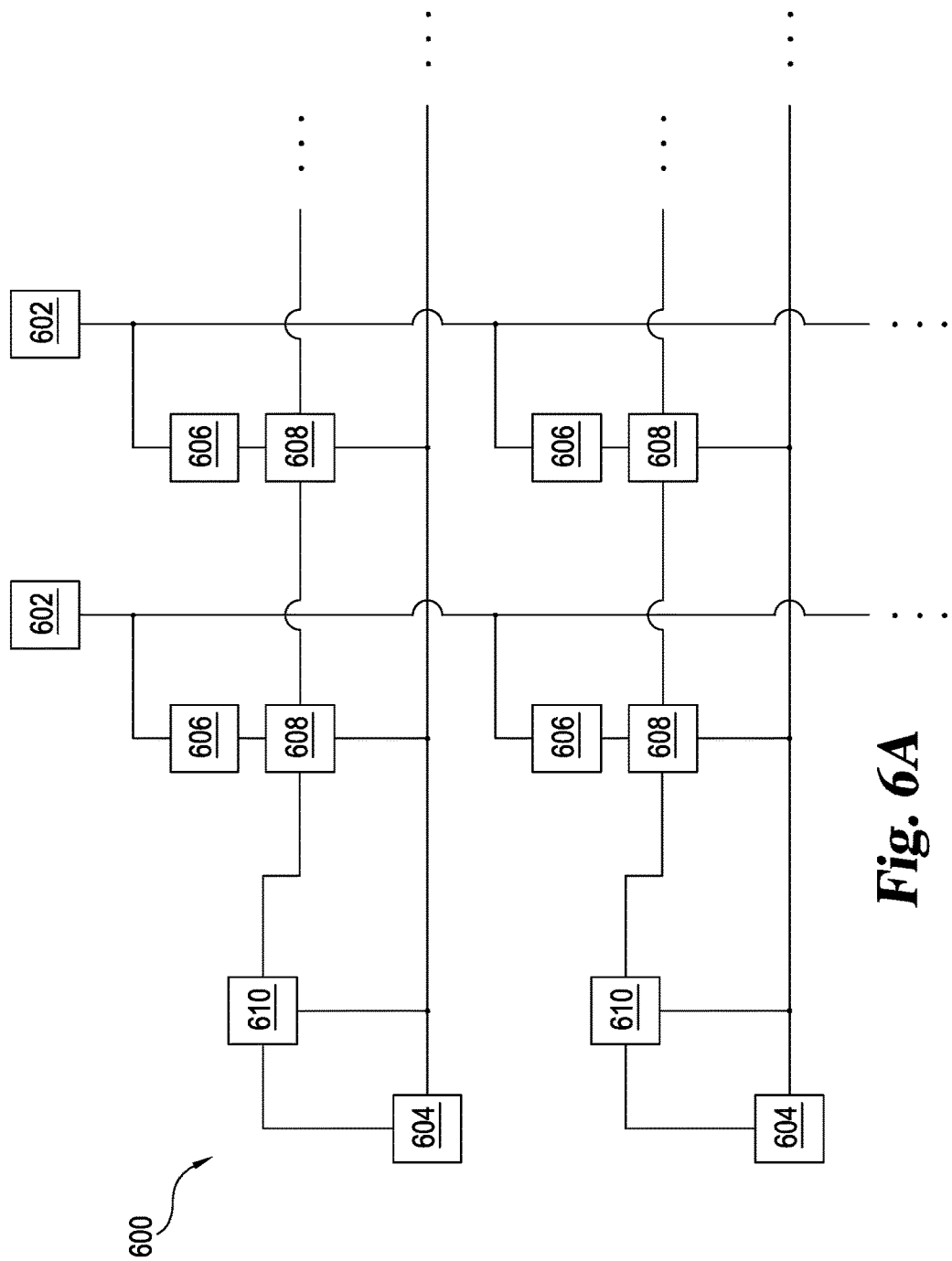
FIG. 6A shows an example matrix circuit diagram suitable for use with the arrays of FIGS. 1A-C.

FIG. 6A illustrates an example of an electrical circuit schematic 600 for use in actuating the array of tactile elements. The array circuit 600 is arranged in a matrix such that bidirectional devices 606 are row and column accessible. The matrix advantageously minimizes the number of switches required to address each bidirectional device 606. Additionally, multiple bidirectional devices 606 can be actuated simultaneously given this matrix configuration. The bidirectional devices 606 can be electric coils as illustrated in FIGS. 2A and 2B, element 212. The array circuit 600 includes a first plurality of switches 602 that when activated address a column of bidirectional devices 606. The array circuit 600 also includes a plurality of switches 604 that when activated address a row of bidirectional devices 606. In this manner a specific bidirectional device 606 can be addressed via the activation of a unique column switch 602 and a unique row switch 604. In order to reduce the current through parallel/series bidirectional devices 606 especially when the bidirectional devices 606 are of low impedance, the circuit includes a plurality of semiconductor devices 608. These semiconductor devices 608 can take the form of one or more switches (such as transistors) or diodes. Without these semiconductor devices 608, sneak paths between low impedance bidirectional devices can cause the inadvertent actuation of an uncommanded device. It is also advantageous to include a circuit 610 configured to activate the semiconductor devices 608 (assuming the semiconductor devices are active components like switches) when a corresponding row addressing switch 604 is activated. The circuit elements 610 minimizes the number of signals required to address each bidirectional device 606.

The matrix circuit illustrated in FIG. 6A can also allow for the use of dynamic braking when unique column switch 602 and a unique row switch 604, and, if so configured, a corresponding active semiconductor device 608 is closed while the permanent magnet is in motion without applying current to the bidirectional device 606. If the bidirectional device 606 is a coil with a permanent magnet moving through the coil, then current flow can be induced through the coil and therefore the circuit formed by activating the previously mentioned switches. If this current is then supplied to a storage medium, the dynamic braking forms a regenerative brake that can recover energy through the actuation of the device.

As will be apparent from the present disclosure, the actuation mechanism in combination with the circuit disclosed can be used to cycle the tactile array in a relatively short period of time. Specifically, some arrays can be cycled in less than 0.2 seconds. Additionally, an array of 1,200 elements can preferably be cycled in less than 2 seconds and more preferably in less than 1 second.

Figure 6B:
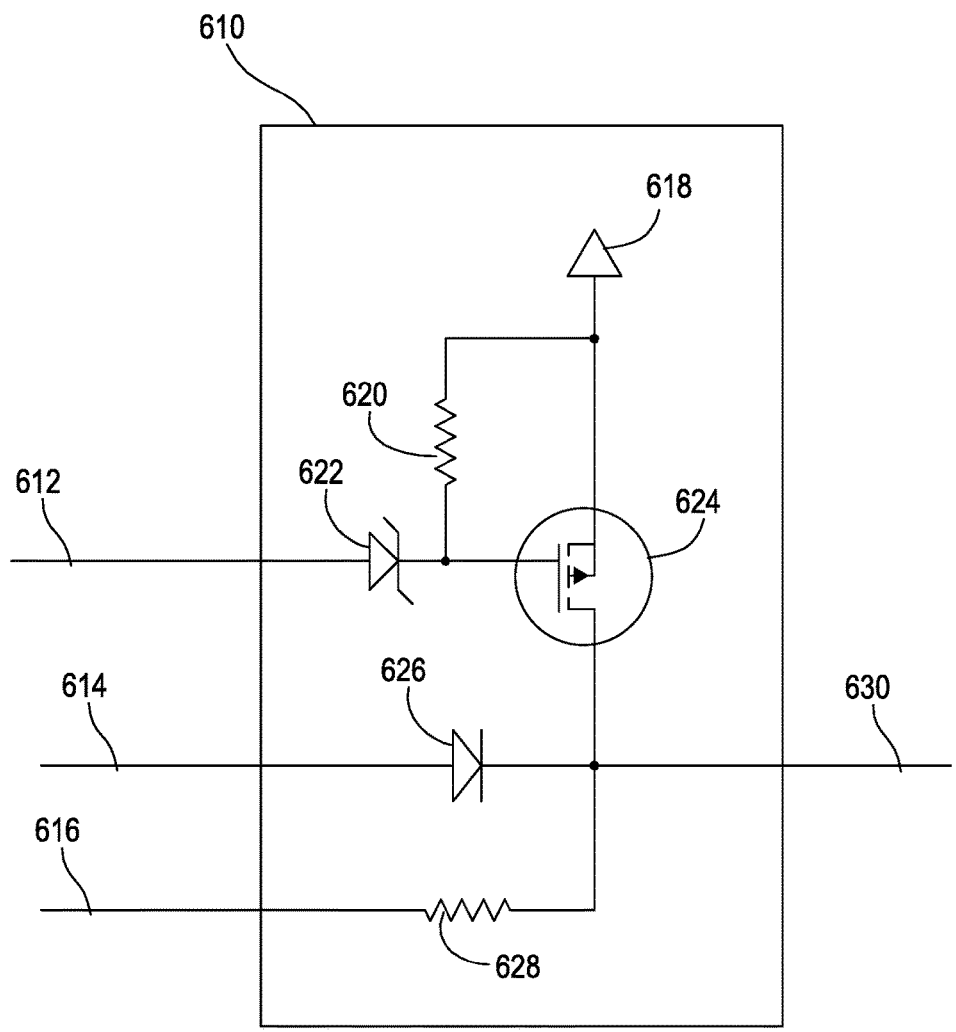
FIG. 6B shows an example circuit suitable for us in the matrix circuit of FIG. 6A for minimizing the number of command lines needed to actuate the circuit of FIG. 6A

The circuit of FIG. 6B illustrates an example circuit 610 suitable for use with the circuit of FIG. 6A. Circuit 610 is for automatically activating a column or row of active semiconductor devices 608 when a corresponding column or row of array circuit 600 is addressed. As an example, a column switch 602 or a row switch 604 can each be configured to contain two MOSFETs allowing current to flow through the bidirectional device 606 in both directions. A MOSFET can also be used as an active semiconductor device 608. For this example, the semiconductor device 608 is an n-channel MOSFET (not shown) whose gate is driven by the gate command line 630. Additionally, the row switch 605 or column switch 602 activated by the circuit contains a p-channel MOSFET (not shown) whose gate is in parallel with line 612 and an n-channel MOSFET whose gate is in parallel with line 614. Additionally, line 616 is in parallel with the drain of both the n-channel and p-channel MOSFETs contained in the row switch 605 or column switch 602 and the source of the n-channel MOSFET used in the semiconductor device 608. The drain of the n-channel MOSFET used in the semiconductor device 608 is connected to the bidirectional device 606.

The circuit 610 includes a p-channel MOSFET 624, a high side resistor 620, a low side resistor 628, a zener diode 622 and a diode 626. For this example, line 618 is at a voltage such that the difference between the voltage on line 618 and the supply voltage to drive the bidirectional device is less than the breakdown voltage of the zener diode 622 but greater in magnitude than the $V_{TH}$ of the p channel transistor 624 and a greater than the $V_{TH}$ of a transistor if used for the semiconductor device 608. If line 614 is driven high and line 612 is driven high, the circuit 610 allows current to flow through line 630 to the gate of the n-channel MOSFET used in the semiconductor device 608 at a voltage level equal to the voltage applied to line 614 minus the voltage drop of the diode. Because line 614 is in parallel with the n-channel MOSFET used in the row switch 605 or the column switch 602, the n-channel MOSFET can be activated if its source is connected to ground, which in turn allows line 616 to be brought to ground potential. As such, the n-channel MOSFET used in the semiconductor device 608 is activated. The zener diode 622 allows the resistor 620 to hold the voltage at the gate of the p channel transistor 624 at the voltage on line 618 since the p channel MOSFET is activated by a voltage that is below its source voltage.

Conversely, if line 612 is driven low and line 614 is driven low, the circuit 610 will allow the voltage applied to line 618 to be present on line 630 and the gate of the n-channel MOSFET used in the semiconductor device 608. Because line 612 is in parallel with the p-channel MOSFET used in the row switch 605 or the column switch 602, the p-channel MOSFET can be activated if its source is connected to the voltage source used to drive the bidirectional device 606, which in turn allows line 616 to be brought to the same voltage level. As such, the n-channel MOSFET used in the semiconductor device 608 is activated since the voltage applied to its gate is greater than $V_{TH}$ plus its source voltage.

Definitions and Alternatives

Bidirectional device—an electrical device that allows current to flow through it in two directions. Examples include wires, mechanical switches such as relays, coils, and inductors.

Braille character—a character configured to be tactically sensed by a person representing a letter in the English alphabet. Each character contains 6 or 8 dots that can be in a raised position or a lowered position. The height of each braille dot can vary between 0.015 and 0.030 inches. The nominal base diameter of each braille dot can vary between 0.04 and 0.08 inches. The nominal distance from center to center of adjacent dots horizontally and vertically in each character can vary between 0.07 and 0.12 inches.

Computer—an electronic device for storing and processing data, typically in binary form, according to instructions given to it in a program.

Dynamic braking—The conversion of kinetic energy into electrical energy. Examples include using a generator as a dynamo to convert rotational energy to electrical energy or a coil of wire to convert the kinetic energy of a permanent magnet moving within the coil into electrical energy. The electrical energy produced can be stored or used in the case of regenerative braking or dissipated in the case of rheostatic, or resistive braking.

Magnetically reactive material—a material containing atoms that each have a magnetic field and that are positionable to reinforce each other. Examples include ferrous alloys containing iron.

Non-destructively—does not cause significant damage such as to impede the continued functioning of a device.

Permanent magnet—a magnet that retains its magnetic properties in the absence of an inducing field or current. Examples include refrigerator magnets and rare earth magnets.

Regenerative Breaking—the conversion of kinetic energy into electrical energy and supplying the electrical energy to a storage medium.

Rare earth magnet—a magnet made from alloys of rare earth elements. Examples include neodymium and samarium-cobalt magnets.

Semiconductor Device—components that exploit the electronic properties of semiconductor materials, principally silicon, germanium, and gallium arsenide, as well as organic semiconductors. Examples include diodes, transistors, microprocessors, and solid-state devices.

Switch—an electrical device used to open or close an electrical connection. Examples includes relays, transistors, contactors, triacs, and DIP switches.

Tactile Element—an object capable of being sensed through touch. Examples include braille dots, keyboard keys, and phone buttons.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:
1. An array of displayed dots suitable for use as a braille character,
  wherein each dot is suitable for being in a first raised position to become part of the braille character and a second position that does not serve as a part of a braille character, wherein each dot has an associated mechanism magnetically latched, without the need for an electric retaining current, corresponding to each of the two positions using permanent magnetism, wherein the array includes a permanent magnet for each dot, together with an electric coil for each permanent magnet positioned to change the position of said permanent magnet in response to current through said coil and said electric coils each encircle a corresponding permanent magnet, and wherein the average current through said coil is substantially greater during the first half of the travel of said permanent magnet than during the second half of the travel toward a latched position, and moves said permanent magnet partially between said two positions taking advantage of the momentum acquired by the motion of the permanent magnet during the first half of travel to allow a reduction in current during the second half of travel.

2. The array of claim 1 in which there is no current externally applied through said coil during the last 10% of the travel of said permanent magnet toward a latched position.

3. The array of claim 1 additionally comprising dynamic braking of said permanent magnet during a portion of the second half of the travel toward a latched position.

4. The array of claim 3 wherein a magnetically reactive material is encircled by said electric coil and is utilized for said magnetic latching in the first or second position.

5. An array of displayed dots suitable for use as a braille character, wherein each dot is suitable for being in a first raised position to become part of the braille character and a second position that does not serve as a part of a braille character, wherein each dot has at least one uniquely associated permanent magnet and an associated dual state latch in which each of the dual states is maintained using said uniquely associated permanent magnet, wherein each of said at least one uniquely associated permanent magnets are adapted to latch successively at each of the two positions, with movement induced by current flowing in an adjacent coil, and wherein the average current through said coil is substantially greater during the first half of the travel of said permanent magnet than during the second half of the travel toward a latched position, and moves said permanent magnet partially between said two positions taking advantage of the momentum acquired by the motion of the permanent magnet during the first half of travel to allow a reduction in current during the second half of travel.

* * * * *